United States Patent [19]

Cartner

[11] Patent Number: 4,495,754
[45] Date of Patent: Jan. 29, 1985

[54] TRAILING WING MOWER WITH HYDRAULIC BREAKAWAY SYSTEM

[76] Inventor: Jack O. Cartner, 1005 N. Eighth, Cambridge, Ohio 43725

[21] Appl. No.: 447,789

[22] Filed: Dec. 8, 1982

Related U.S. Application Data

[63] Continuation-in-part of Ser. No. 377,347, May 12, 1982, Pat. No. 4,442,658.

[51] Int. Cl.³ .......................................... A01D 35/28
[52] U.S. Cl. ..................................... 56/11.9; 56/10.4; 56/15.8; 56/13.6; 91/422; 91/437
[58] Field of Search .................. 56/10.2, 10.4, 10.7, 56/10.9, 11.9, 15.2, 15.3, 15.5, 15.8, DIG. 15, 13.6; 91/422, 437; 60/468

[56] References Cited

U.S. PATENT DOCUMENTS

| | | | |
|---|---|---|---|
| Re. 24,006 | 5/1955 | Acton | 91/437 |
| 2,316,235 | 4/1943 | Gast | 91/437 |
| 2,920,434 | 1/1960 | Ingram | 56/25.4 |
| 2,952,961 | 9/1960 | Engler | 56/25.4 |
| 3,236,036 | 2/1966 | Bailey et al. | 56/11.9 |
| 3,400,521 | 9/1968 | Caldwell | 56/6 |
| 3,527,032 | 9/1970 | Wood | 56/6 |
| 3,699,847 | 10/1972 | Little | 91/411 |
| 3,729,910 | 5/1973 | Hardee | 56/11.9 |
| 3,751,191 | 7/1973 | Mott, Jr. | 417/313 |
| 3,924,514 | 12/1975 | Parsons et al. | 91/422 |
| 3,949,539 | 4/1976 | Cartner | 56/10.4 |
| 4,050,359 | 9/1977 | Mayer | 91/422 |
| 4,183,195 | 1/1980 | James | 56/11.9 |
| 4,308,713 | 1/1982 | James | 56/11.9 |
| 4,313,633 | 2/1982 | Muntjanoff et al. | 91/437 |
| 4,359,931 | 11/1982 | Palmersheim et al. | 91/441 |

FOREIGN PATENT DOCUMENTS 150234 11/1981 Japan .................. 37/80 R

OTHER PUBLICATIONS

Terrain King Advertisement of The Hydro-15, published unknown.
Terrain King Advertisement of Versa Mower, published unknown.
Terrain King Advetisement of The TK-15, published unknown.
Woods Data Sheet—Woods Metal H-S 105/106 (states as prior art in parent case) 3-1982.

*Primary Examiner*—Gene Mancene
*Assistant Examiner*—David I. Tarnoff
*Attorney, Agent, or Firm*—Fay & Sharpe

[57] ABSTRACT

A hydraulic wing mower includes a central section (A) to which a left wing section (B) and a right wing section (C) are pivotally connected. A first hydraulic cylinder (100) is operatively connected between the central section and left wing section for selecting its angular position and a second hydraulic cylinder (100') is operatively connected between the central section and the right wing section for selecting its angular position. A hydraulic circuit provides hydraulic fluid under pressure from a reservoir (120) to a wing angular position control valve (170). The wing angular position control valve selectively directs hydraulic fluid under pressure to the first and second cylinders to select an angular orientation for the left and right wings. A pressure relief valve (180) is selectively connected between the hydraulic cylinders and the reservoir. When an upward force occurs on one or both of the wing members, e.g. when a wing member engages an upward incline or the central section moves into a depression, the hydraulic fluid flows from the cylinders through the relief valve to the reservoir. This allows one or both wing sections to yield or breakaway under an upward force. In the preferred embodiment, the wings do not yield or breakaway under a downward force such that they may be cantilevered over a ravine or the like.

18 Claims, 8 Drawing Figures

TRAILING WING MOWER WITH HYDRAULIC BREAKAWAY SYSTEM

BACKGROUND OF THE INVENTION

This application is a continuation-in-part of application Ser. No. 377,347 filed May 12, 1982, now U.S. Pat. No. 4,442,658.

This application pertains to the art of mowing machines for grass and brush. More particularly, the invention relates to wide sweep or wing mowers which are designed to be towed by tractors or other vehicles. The invention finds particular application in mowers for maintaining the grass medians of highways and will be described with particular reference thereto. It is to be appreciated, however, that the invention has broader applications including machines for maintaining and reclaiming large expanses of grasses, weeds, light brush, and trees up to about a 5 inch diameter.

Numerous tractor towed mowing devices or trailing mowers have been known to the art, note for example U.S. Pat. No. 2,952,961, issued Sept. 1960 to J. F. Engler, U.S. Pat. No. 3,400,521, issued Sept. 1968 to Caldwell, U.S. Pat. No. 3,527,032, issued Sept. 1970 to Wood. These prior art trailing mowers included a central mowing assembly which was supported by wheels toward the rear and adapted to be connected with the tractor at the front. A first and a second side or wing mowing assembly was hingedly connected to either side of a mowing central assembly. The hinged interconnection permitted the wing assemblies to be folded vertically to reduce the width of the towed mower and facilitate its transportation. The central and side assemblies each included a cutting blade which was connected by a mechanical gear train with a power take-off of the tractor.

Others have suggested replacing the mechanical drive of trailing mowers with a hydraulic drive system. The above referenced Wood patent mower was also manufactured in a hydraulically driven version. In the hydraulic Wood mower, a power take-off drive the central section cutting blade and a pair of hydraulic pumps. A hydraulic motor was mounted on each wing to drive the associated cutting blade. To cool the hydraulic fluid, a heat exchanger was mounted in direct contact with each wing deck around the wing hydraulic motors. More specifically, the heat exchangers were tank-like channels which were welded to the lower surface of the wing decks. Other mowers with deck mounted heat exchangers were manufactured by Triumph Machinery Company of Hackettstown, N.J. In the Triumph heat exchanger, the upper deck of the mower adjacent the cutting blade served as the base of the heat exchanger. A generally U-shaped channel and end plates were welded to the upper deck to define a relatively flat, elongated heat exchanger through which the hydraulic fluid was channelled. In all of the above referenced mowers with heat exchangers, the up draft created by the rotatory motion of the cutting blades circulated cooling air against the deck and heat exchanger. Yet another mower which incorporated deck mounted heat exchangers was illustrated in U.S. Pat. No. 4,308,713 issued Jan. 1982 to James.

In the prior art trailing wing mowers, the wing sections were hingedly connected with the central section. Commonly, the mowers included a position controlling means for the wing sections which has at least two modes of operation. In a first mode, the position controlling means locked the wings in a vertical position for transport. In a second mode, the wings were allowed to float freely and follow the irregular terrain being mowed. Hydraulic wing positioning systems are illustrated in the above referenced Caldwell, James, and Wood patents. The Caldwell patent further suggests a third mode in which the wings are locked in selected adjusted positions.

It is desirable to lock the wings in conformity with the pitch of terrain when moving along a drop off, on relatively smooth terrain with some potholes or depressions, and other conditions with the wings might otherwise bottom out. As another example, when the terrain is rough and washboard-like, it is desirable to lock the wings to inhibit excessive bouncing and jarring.

When the wings were locked in a mowing position and the central section encountered a depression or a wing encountered a rise, the supporting wheels of the center section were lifted from the ground. This placed undue stresses on the mower, particularly the hinge between the center and wing sections.

Another problem encountered in prior art mowers which incorporated a heat exchanger in conjunction with the upper deck was that wet grass sometimes formed a mat or cake between the deck and cutting blades. This cake or mat tended to insulate the deck from the cooling air circulated by the cutting blades.

Yet another problem encountered when mounting the heat exchanger directly on the deck, is that the deck and with it the heat exchanger may be punctured by rocks or the like thrown up by the blades.

The present invention contemplates a new and improved wing mower which has a hydraulic control circuit that provides improved wing orientation control and improved heat transfer characteristics.

SUMMARY OF THE INVENTION

In accordance with a first aspect of the invention, there is provided a trailing wing mower which comprises a first mower section including supporting means movably supporting the first section above the ground and a motor means for providing motive power to a first cutting means. A second motor section includes a supporting means for movably supporting the second section above the ground and a means for providing motive power to a second cutting means. A hinge means operatively connects the first and second sections such that the second section is arcuately displaceable relative to the first section about the hinge means. An angular position controlling means selectively fixes the angular position of the second section relative to the first section. The position controlling means permits the second section to be angularly displaced or breakaway relative to the first section under an external urging force which exceeds a selected external force.

In accordance with a more limited aspect of the invention, the angular position controlling means only permits relative upward movement of the second section or relative downward movement of the first section under the external force.

A primary advantage of the present invention is that it permits the wing sections to release from a fixed position under a sufficient external force.

Another advantage of the present invention is that it protects the mower from potentially damaging forces.

Still further advantages will become apparent upon reading and understanding the following detailed description of the preferred and alternate embodiments.

BRIEF DESCRIPTION OF THE FIGURES

The invention may take form in various parts and arrangements of parts. The drawings are only for purposes of illustrating a preferred embodiment and are not to be construed as limiting the invention.

DETAILED DESCRIPTION OF THE PREFERRED EMBODIMENT

Figure 1:
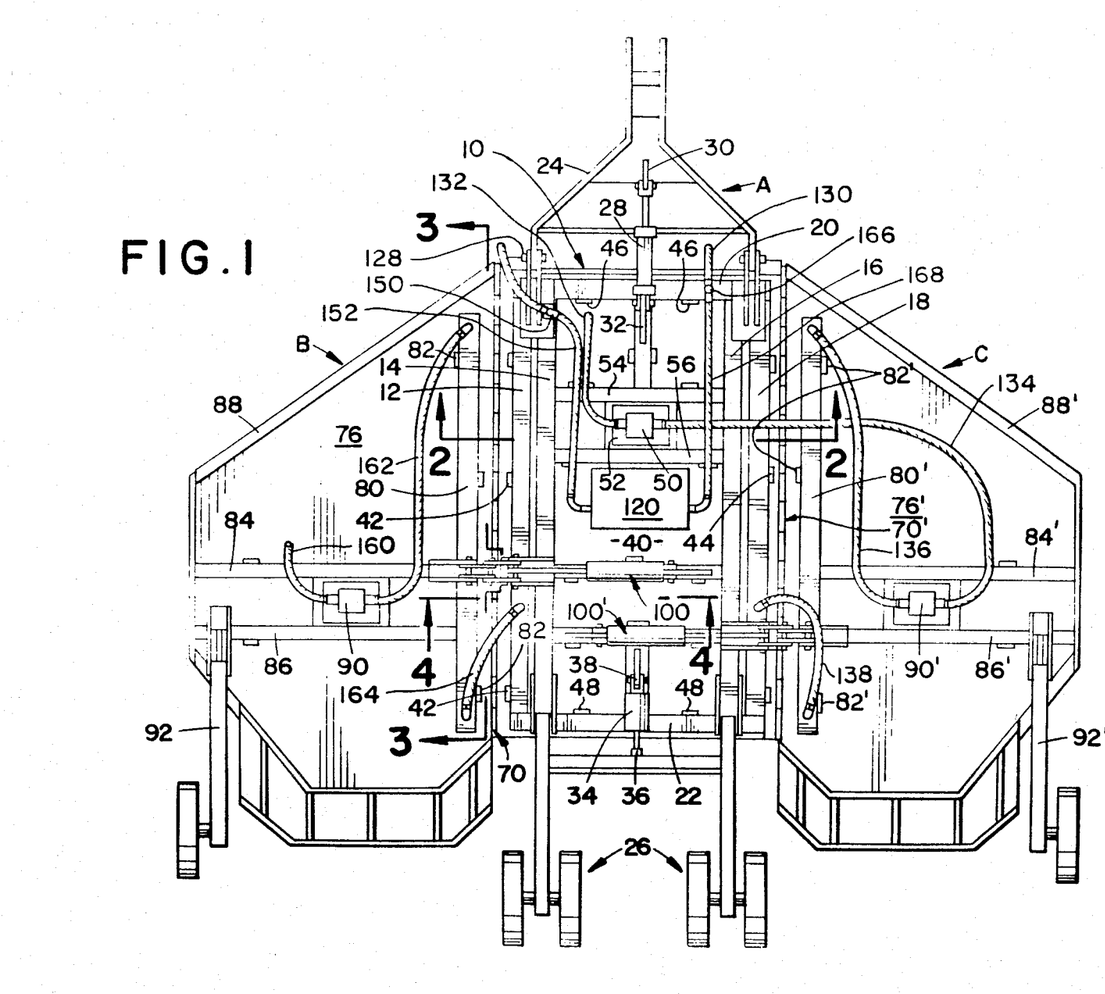
FIG. 1 is a top plan view of a trailing wing mower in accordance with the present invention.

With particular reference to FIG. 1, a multi-section trailing wing mower includes a first or central mower section A to which a second or left wing mower section B is pivotally connected at one side and to which a third or right wing section C is connected along an opposite side. The multi-section mower is intended to be trailed behind a tractor or other prime mower for cutting grass and brush to a selected height.

The central section A includes a tubular assembly 10 which functions as a frame providing structural strength to the central section and heat exchanger for cooling hydraulic fluid. The tubular assembly includes a first side pair of tubular channel members 12 and 14, a second side pair of tubular channel members 16 and 18, a front tubular channel member 20, and a rear tubular channel member 22. A front end supporting means, particularly a trailer hitch 24, is connected with the front and side tubular channel members. A rear end supporting means, particularly a wheel assembly 26, is connected with the rear and side tubular members for movably supporting the rear of the central section. A front end ground clearance adjusting means, particularly a fluid cylinder 28, interconnected between a hitch bracket 30 and a central section bracket 32, adjusts the altitude of the front of the central section above the ground by adjusting the angle between the trailer hitch and the central section. A rear end ground clearance adjusting means, particularly a fluid cylinder 34, interconnected between a wheel assembly bracket 36 and a central section bracket 38, adjusts the altitude of the rear end of the central section above the ground. By operating the front and rear ground clearance adjusting means, the altitude and orientation of the central section relative to the ground is selectively adjustable.

A plurality of spacing means support the tubular assembly 10 in a fixed, spaced relationship with a deck 40. Specifically, a first angle bracket 42 is welded to the deck and one of the first pair of tubular members 12 and 14; a second angle bracket 44 is welded to the deck and one of the second pair of tubular members 16 and 18; a plurality of spacing brackets 46 are welded to the deck and the front tubular member 20; and a plurality of spacing brackets 48 are welded to the deck and the rear tubular member 22. Additional spacing brackets are welded to the deck and non-hydraulic fluid carrying support members which are structurally connected with the combined frame and heat exchanger. The spacing between the deck and the tubular assembly is sufficiently large that air flow therebetween is facilitated yet sufficiently small that a structural supportive interaction therebetween is provided. In the preferred embodiment, the spacing is about a half inch.

The deck 40 is of sufficiently heavy gauge to shield the operator and parts of the central section from mown grass, brush, rocks and the like. The number of spacing brackets can be decreased with a heavier gauge deck and increased with a lighter gauge deck.

Figure 2:
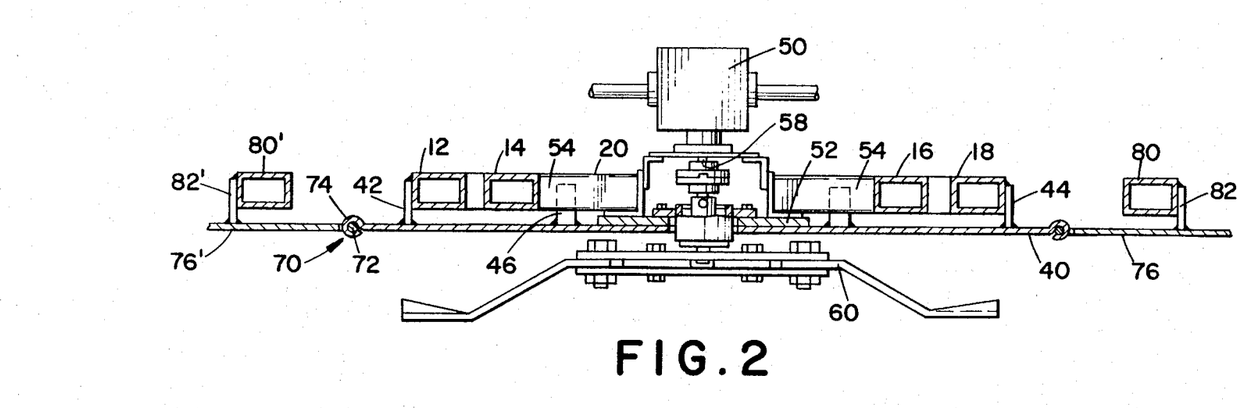
FIG. 2 is a sectional view through section 2—2 of FIG. 1.
Figure 3:
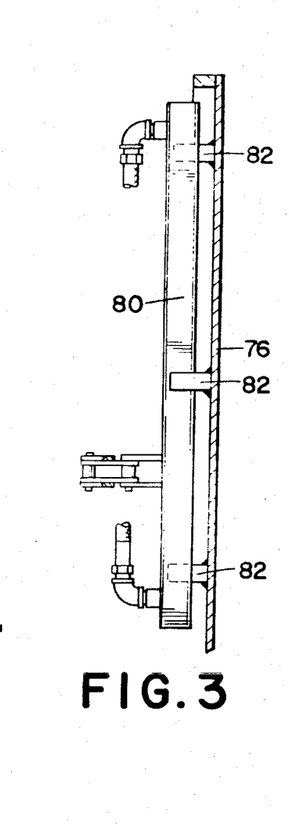
FIG. 3 is a sectional view through section 3—3 of FIG. 1.

With continuing reference to FIG. 1 and particular reference to FIG. 2, a first hydraulic motor 50 is mounted on a motor support plate 52 which extends between motor support members 54 and 56. In the preferred embodiment, the motor support members are structurally but not fluidically connected with the side tubular members 14 and 16. The hydraulic motor 50 rotates a motor shaft 58 which extends to an aperture in the deck. A first or central section cutting blade 60 is connected with the motor shaft below the deck to be driven by the hydraulic motor.

The second or left wing section B is substantially the same as the third or right wing section C. For simplicity of illustration and to emphasize the similarity, elements of the third section are denoted by the same reference numeral as like elements of the second section but followed by a prime ('). The following description of the wing section is to be understood as describing both the left and right wing sections.

With continual reference to FIGS. 1 and 2, a hinge means 70 connects the wing section with the first or central section A. The hinge means includes a plurality of hinge pins 72 which are connected with the central section deck 40 and a plurality of at least partially surrounding hinge portions 74 which are integrally connected with a wing section deck 76.

The wing section includes a wing tubular member 80 which functions both as a structural framing or support member and optionally may also function as a heat exchanger. A plurality of wing spacing brackets 82 mount the wing tubular member 80 in a fixed, spaced relationship with the wing deck 76. A pair of wing motor support members 84 and 86 extend from the tubular member 80 to an upstanding peripheral edge portion 88. Optionally, the wing motor support members may carry hydraulic fluid and function as a heat exchanger. A wing hydraulic motor 90 is mounted between the wing motor supports 84 and 86. Like the first hydraulic motor, the wing hydraulic motor 90 is drivingly connected with a rotary cutting blade disposed below the wing deck. A wing support wheel assembly 92 provides support to assist in maintaining the wing section with a preselected ground clearance.

Figure 4:
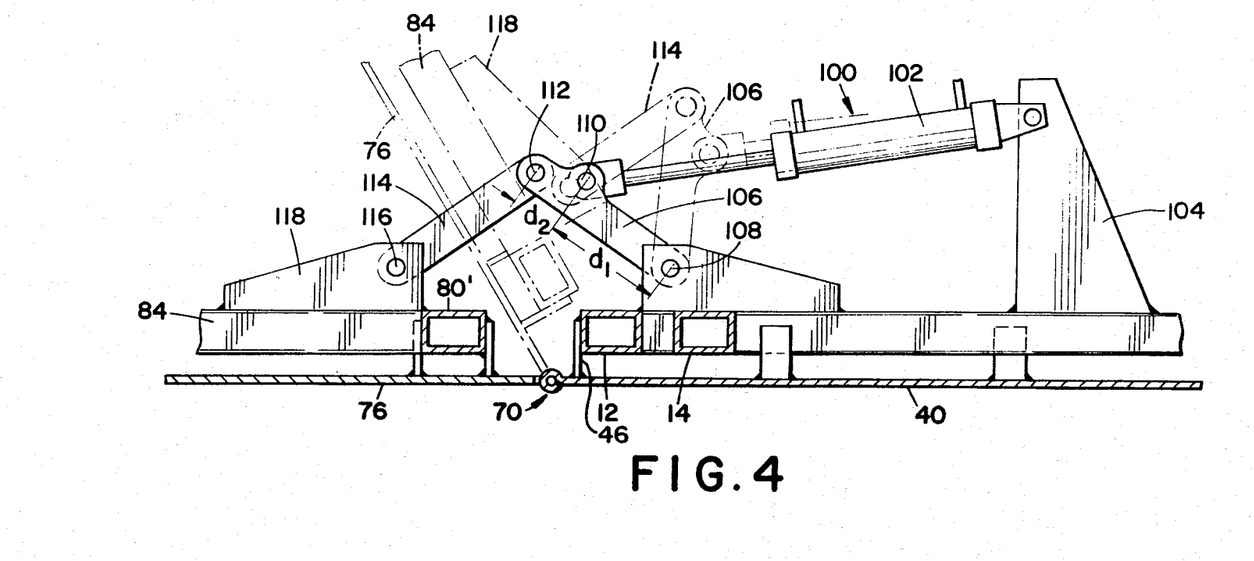
FIG. 4 is an enlarged sectional view through section 4—4 of FIG. 1 illustrating a wing angular position controlling assembly.

With particular reference to FIG. 4 and continued reference to FIG. 1, the angular position of the wings is controllable such that the wings can be folded vertical for easier transport and at various angles relative to the central section to facilitate mowing on rolling terrain and embankments. Again, the elements for controlling the angular orientation of the right wing which are the same as the elements for controlling the angular orientation of the left wing are denoted by the same reference numeral but followed by a prime ('). A wing angular position controlling means 100 controls the angular position of the wing section relative to the central section. A hydraulic cylinder 102 is connected with the central frame structure by an upstanding support and the kinematic chain. The kinematic chain includes a driving link 106 which is pivotally connected adjacent one end by a pivot means 108 with the central section tubular assembly, particularly an upstanding support. The hydraulic cylinder is pivotally connected by a pivot 110 with an intermediate portion of the drive link. The other end of the drive link is connected by a pivot means 112 with a floating link 114. The floating link 114 is pivotally connected by a pivot means 116 with a flange 118 which, in turn, is connected with the wing frame member 84. The central section functions as a frame link of the kinematic chain and the wing section functions as the follower, such that selectively extending and contracting the hydraulic cylinder selectively controls the position of the wing section. A distance $d_1$ between the pivot 108 and the pivot 110 relative to a distance $d_2$ between the pivot 110 and pivot 112 determine the mechanical advantage which the cylinder has. The greater the length of $d_1$ and the shorter the length of $d_2$, the greater the mechanical advantage enjoyed by the hydraulic cylinder. Analogously, by decreasing the distance $d_1$, the mechanical advantage of the cylinder is decreased but so too is the length of travel over which it must move for a corresponding change in the angular position of the wing assembly. By shortening $d_1$, a hydraulic cylinder with a relatively short travel can be used to produce a wide range of angular positions of the wing assembly.

Figure 5:
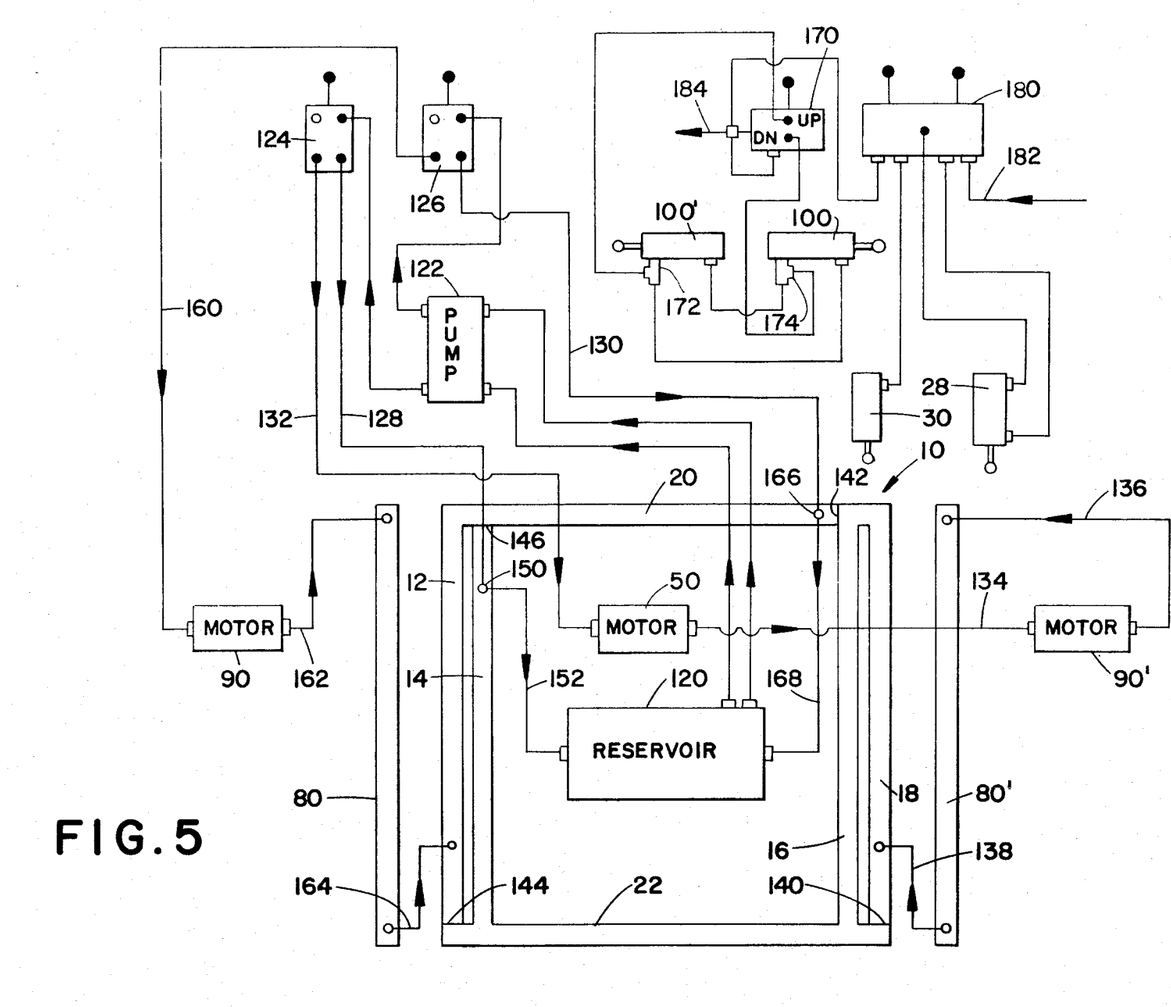
FIG. 5 is a diagrammatic view of a hydraulic system of the trailing wing mower of FIG. 1.

With particular reference to FIG. 5 and continuing reference to FIG. 1, the hydraulic system includes a reservoir 120 mounted directly on the central section deck which receives and further cools hydraulic fluid from the heat exchanger 10. A dual chamber circulating pump 122 is mounted on the tractor adjacent its power take off to be driven thereby. The circulating pump pumps hydraulic fluid from the reservoir 120 to a first control valve 124 and a second control valve 126. The control valves include manual operating levers mounted on the tractor adjacent the operator for controlling the flow rate of the hydraulic fluid pumped therethrough. Each control valve has a recirculating port for returning excess hydraulic fluid back to the reservoir via return lines 128 and 130. A first hydraulic pressure output line 132 is connected with the first hydraulic motor 50 to propel it with the hydraulic fluid. A flexible connector hose 134 connects the right wing hydraulic motor 90' in series with the central hydraulic motor 50. A flexible return line 136 connects the right wing hydraulic motor with the right wing heat exchanger tubular member 80'. A flexible connector 138 connects the other end of the wing heat exchanger with one end of one of the pair of side tubular members 16 and 18, in the preferred embodiment tubular member 18, adjacent one end thereof. A barrier 140 adjacent the connection between tubular member 18 and the flexible connector 138 separates the interior flow paths of side tubular member 18 and bottom tubular member 22. This causes the hot hydraulic fluid to flow the length of the side tubular member 18 toward the front tubular member 20. However, a front barrier 142 causes the hydraulic fluid to return through the side tubular member 16 to the bottom tubular member 22. Another barrier 144 channels the fluid from the bottom tubular member through the side tubular member 14. Yet another barrier 146 marks the end of the tortuous path defined by the tubular members for hydraulic fluid to flow from the central and first wing motors. A tee connection 150 adjacent the closed end of the tubular member 14 is connected with the first valve return line 128 and a flexible connector 152 which leads to the reservoir 120. In this manner, the previously cooled, recirculated hydraulic fluid and the hydraulic fluid which has just passed through the heat exchanger are mixed at the tee connection and returned to the reservoir.

Pressurized hydraulic fluid from the second control valve 126 is connected by a flexible connector 160 with the left wing motor 90. A flexible connector 162 conveys the hydraulic fluid from the left wing motor to the left wing heat exchange tubular member 80. A flexible connector 164 connects the other end of the left wing heat exchanger with one end of the tubular member 12. The barriers 144, 146, and 142 confine the fluid received in the side tubular member 12 to flow therethrough and through the front tubular member 20. In this manner, the hydraulic fluid which has been used to propel a single motor is conveyed through two longitudinally extending members 80' and 12; whereas, the fluid which was used to propel two of the fluid hydraulic motors is conveyed through four of the longitudinal tubular members 80', 18, 16, and 14. A tee connector 166 connects the return line 130 of the second control valve and the cooled fluid at the end of the tubular member 20 with a reservoir return line 168. In the preferred embodiment, the heat exchanger has a fluid capacity of about 35 gallons and the reservoir has a fluid capacity of about 50 gallons. Optionally, the heat exchanger may be increased in size and the reservoir decreased or even eliminated or the reservoir increased in size and the heat exchanger decreased or eliminated. Alternately, the hydraulic fluid can be conveyed directly from the wing motors to the central heat exchanger 10 by-passing the wing heat exchangers 80 and 80'.

A wing angular position control valve 170 selectively provides hydraulic fluid under pressure to the hydraulic cylinders 100 and 100' to raise and lower the wings. More specifically, the wing angular position control valve selectively provides hydraulic fluid under pressure to a cylinder contracting or wing raising chamber 172 and to a cylinder extending or wing lowering chamber 174 of the cylinder 100. By selectively adjusting the hydraulic fluid supplied to the chambers of a hydraulic cylinder, the pressure differential across a cylinder piston 176 is controlled to select the arcuate position of the other wing. Analogously, the cylinder 100' receives fluid pressure in chambers 172' and 174' to maintain the appropriate pressure differential across a piston 176' to select the angular position of the wing. In this manner, the arcuate position of both wings is selected in a coordinated manner.

The relative incompressibility of the hydraulic fluid maintains the position of the wing fixed even if the wing should become suspended over a cliff or ravine or if the wing should be urged upward by an embankment. To permit either or both of the wings to move upward, the hydraulic circuit includes a hydraulic fluid pressure relief means for limiting the pressure in the extension cavities 174 and 174' of the cylinders to a preselected maximum fluid pressure.

In the embodiment of FIG. 5, the pressure relief means includes a pressure relief valve 180 which allows fluid to flow from the chambers 174 and 174' back to the reservoir 120 when the pressure exceeds the preselected maximum fluid pressure. This pressure is selected such that the upward urging force on the wing members when encountering an embankment or the downward urging force on the central section when entering a gulley is sufficient to allow the cylinders to contract without causing the central section to be lifted off the ground by a fixed angular position between the central section and the wing member. The selected urging force, of course, will vary with the mass of the mower and is related directly to the downward gravitational force on the central section wheel or support assembly 26. As the piston 176 or 176' compresses the fluid in the chamber 174 or 174', a check valve 182 permits the piston contraction chamber 172 or 172' to draw fluid from the reservoir 120. Pressure equilibrium across the cylinder piston is quickly reachieved. If the embankment becomes steeper, a similar process allows the wing section to raise still further. If the embankment should decrease in slope and become more level, the angular position valve 170 will reallocate the fluid within the cylinder to reestablish the selected pressure differential and wing position.

In the embodiment of FIG. 5, the hydraulic circuit does not permit the wing section to move in response to a downward urging force. A downward urging force would generally occur when a wing section becomes cantilevered over a ravine, or the like. Downward movement of the canitlevered wing section is likely to cause the cutting means to interact with dirt or rock potentially damaging it. Accordingly, movement of the wing section downward over the ravine requires deliberate operator approval by adjusting the position of the wing angular position control valve 170.

A ground clearance controller 190 receives hydraulic fluid under pressure from the tractor driven pump via an inlet line 192. The controller selectively supplies fluid to the central section front end ground clearance adjusting cylinder 28 and the central section rear end ground clearance adjusting cylinder 34 to raise and lower the front and rear of the central section respectively. Because the weight of the central section and the connected wing sections urges the rear cylinder toward its lowest altitude position, the hydraulic fluid need only be used to raise the rear of the central section while gravity is used to lower it. The front end ground clearance adjusting cylinder is hydraulically controllable in both directions to facilitate connection of the trailer hitch 24 with the tractor. The ground clearance controller 190 further supplies hydraulic fluid to the wing angular position control valve 170 and to a return line 194 which returns hydraulic fluid to the pump and reservoir.

Figure 6:
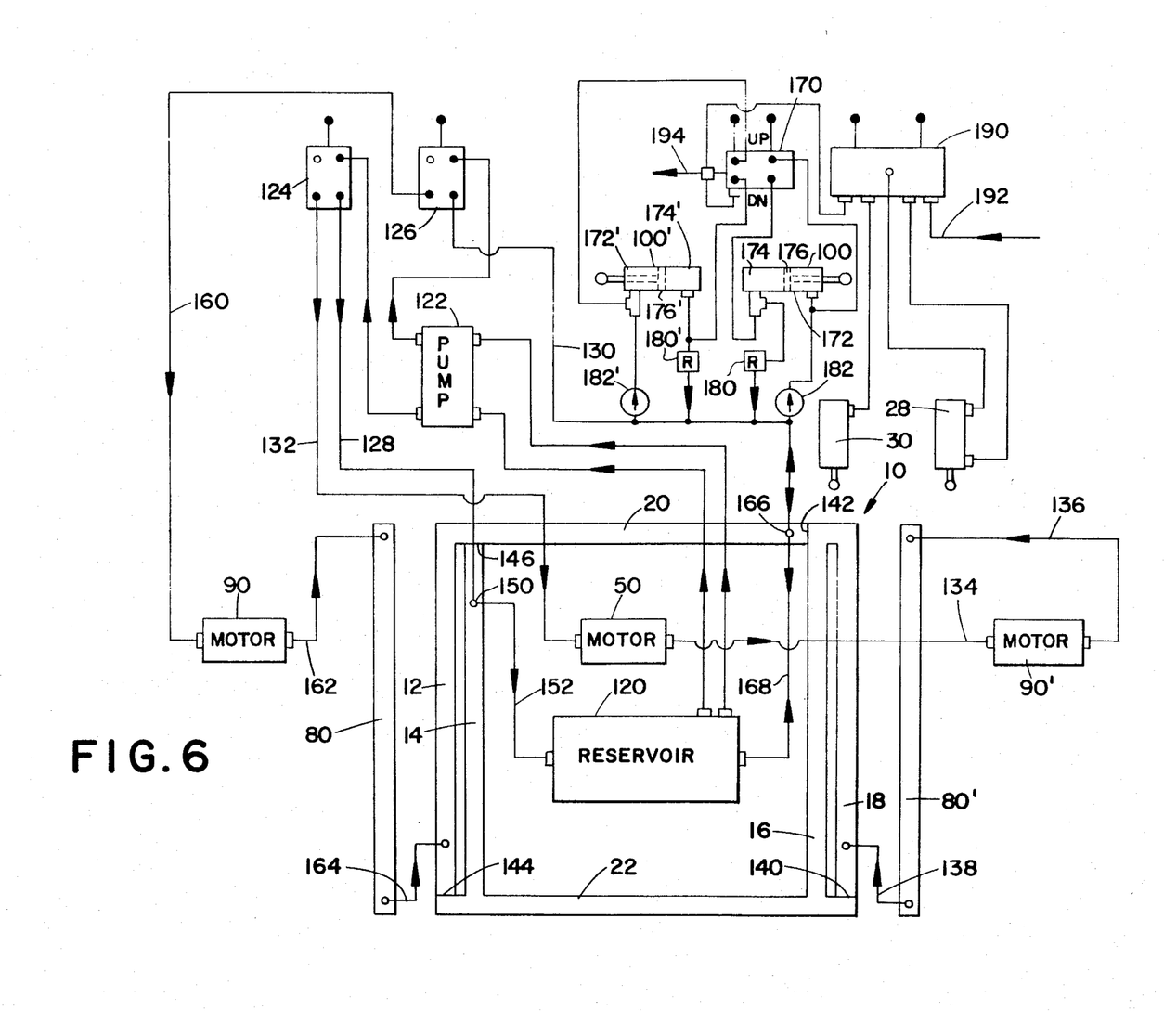
FIG. 6 is a diagrammatic view of a dual wing position control version of the hydraulic system of FIG. 5.

FIG. 6 is analogous to FIG. 5 but with a dual angular position control valve 170 for controlling the left and right wing hydraulic cylinders, separately. Under an upward force on either wing, its associated relief valve 180 (180') allows fluid to flow from chamber 174 (174') to the reservoir 120. An associated check valve 182 (182') allows chamber 172 (172') to draw fluid from the reservoir.

Figure 7:
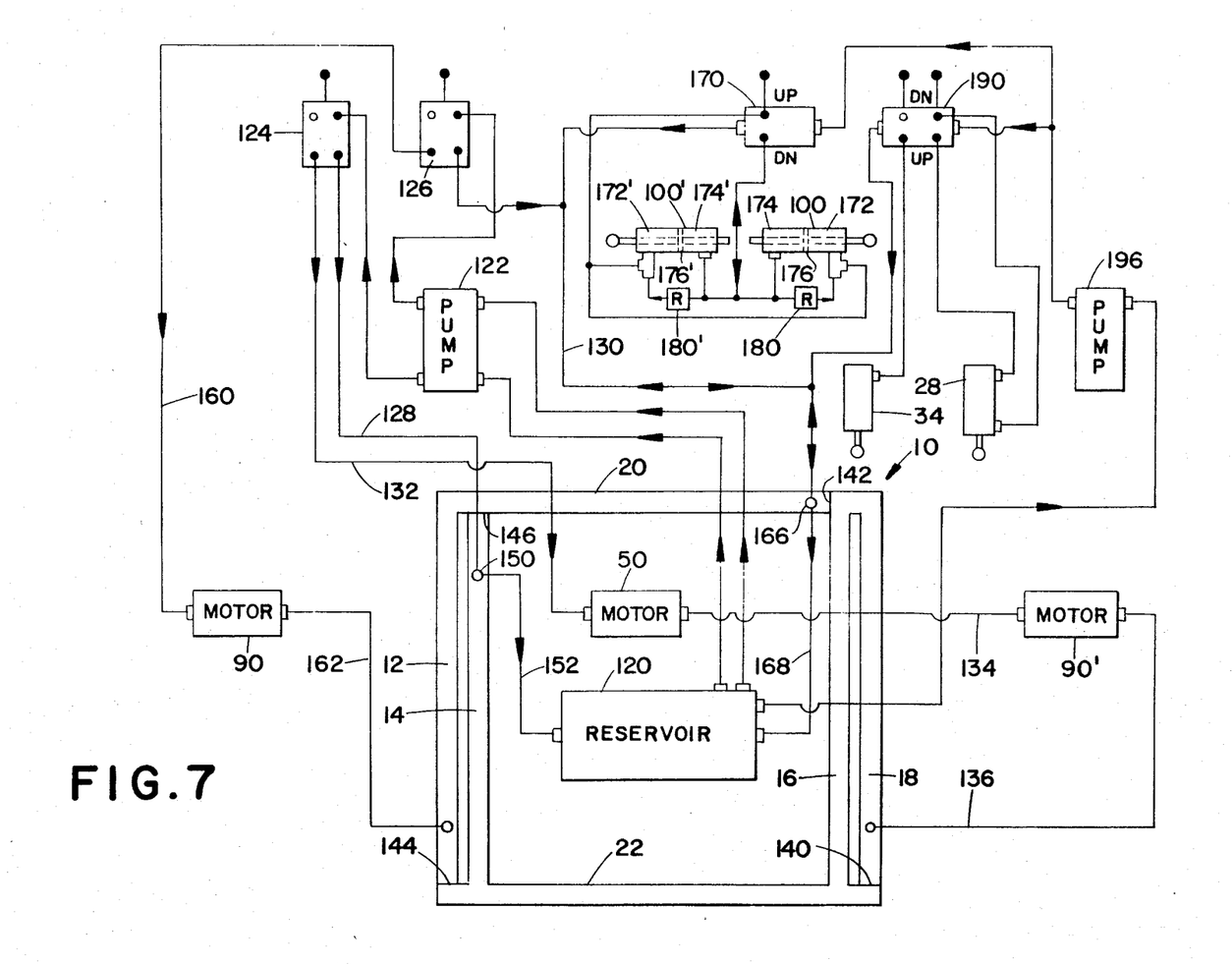
FIG. 7 is a diagrammatic view of an alternate embodiment of the hydraulic system of FIG. 1.
Figure 8:
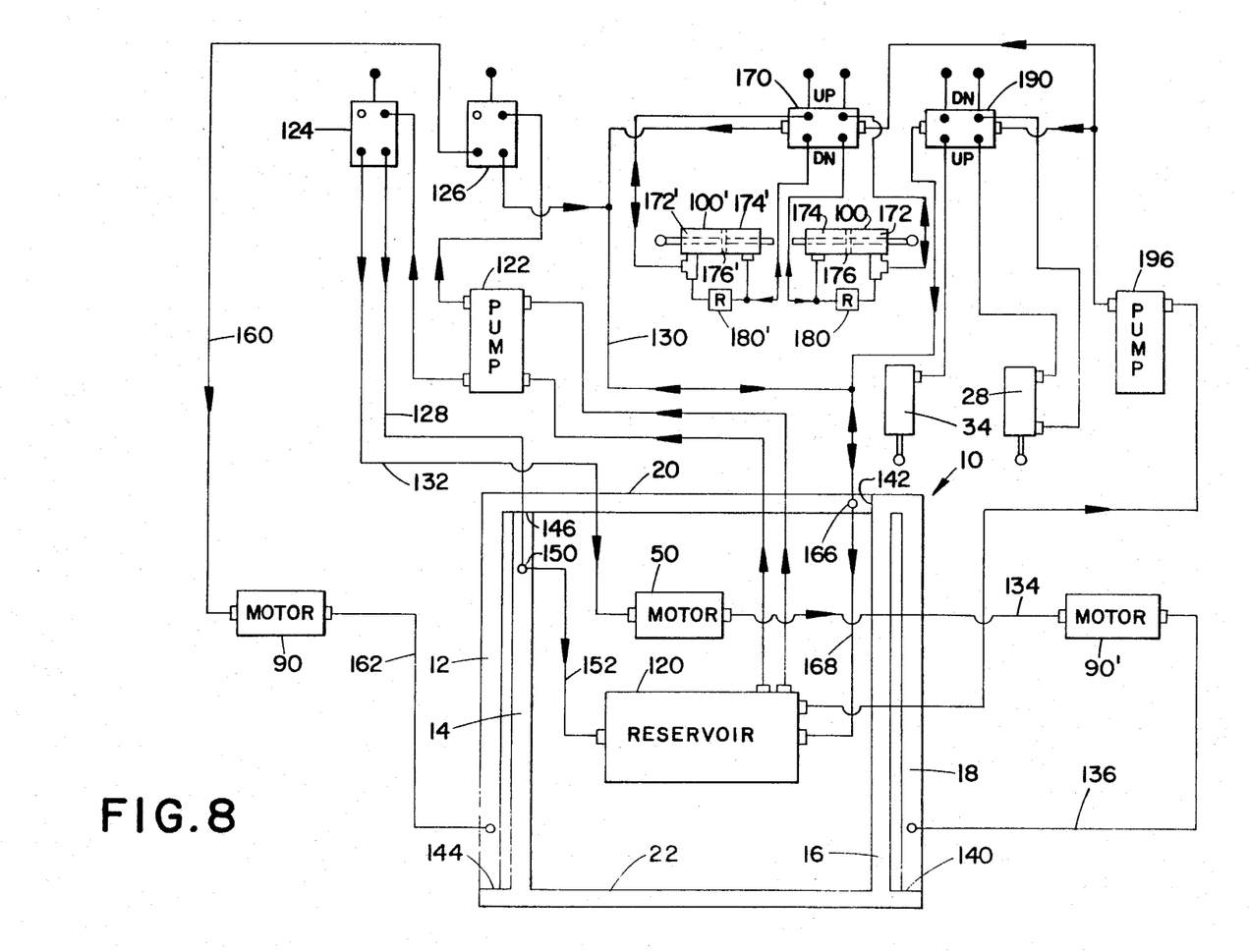
FIG. 8 is a diagrammatic view of a dual wing position control version of the hydraulic system of FIG. 7.

With particular reference to FIGS. 7 and 8, alternate single and dual control embodiments of the hydraulic system are illustrated. The portion of the hydraulic systems for driving the hydraulic motors is essentially the same as in FIGS. 5 and 6. However, the heat exchanger differs from the heat exchanger illustrated in FIGS. 5 and 6 in that the wing mounted heat exchangers or longitudinally extending members 80 and 80' have been eliminated. It has been found that under normal mowing conditions, the cooling capacity of the central section heat exchanger is sufficient to maintain the hydraulic fluid below its breakdown temperature.

A pump 196 supplies hydraulic fluid from the reservoir 120 under pressure to a ground clearance controller valve 190 and to a wing angular position control valve 170.

With reference to FIG. 7, the wing angular position control valve 170 controls through-rod type cylinders 100 and 100' together. A preselected pressure differential is maintained across pistons 176 and 176' by the angular position control valve. In response to upward urging of the wings, relief valves 180 and 180' allow fluid to flow from chambers 174 and 174' to chambers, 172 and 172', respectively. In this manner, each wing yieldingly moves upward.

In the embodiment of FIG. 8, the wing angular position control valve is a four way hydraulic control valve with system relief. The parts of through-rod type cylinder 100' are described with the same reference number as cylinder 100 but followed by a prime. For simplicity of illustration, a description of the functioning of cylinder 100 is given and it is to be appreciated that the description applies by analogy to cylinder 100'. The wing position control valve individually controls the pressure differential across pistons 176 and 176' in cylinders 100 and 100', respectively. In this manner, a fixed angular orientation of the each wing is independently selectable. If the terrain should drop off and the wing supporting wheel structure 92 should cease to engage the grounds, the incompressibility of the hydraulic fluid in cylinder chamber 172 prohibits the cylinder from being extended and the wing lowered. However, if the wing ground engaging wheel engages an upward rise, the wing support wheel is urged upward and with it the wing. This urging forces increases the pressure on the fluid in chamber 174 of the cylinder 100. A pressure relief valve 180 limits the amount of pressure within the chamber 174. Thus, in response to an upward urging force on the wing, the pressure relief valve 180 opens allowing fluid to flow from chamber 184 which in turn contracts the cylinder 100 allowing the wing to be raised. The relief valve 180 channels the fluid flow to the chamber 172 to maintain the selected pressure across the piston 176. In this manner, the hydraulic circuit allows the wing sections to yield upward or breakaway when a change in the terrain is encountered.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described a preferred structure embodying the invention, the invention is now claimed to be:

1. A trailing wing mower comprising:
   a first mower section including supporting means for movably supporting the first section above and substantially parallel to the ground immediately thereunder and a first motor means operatively connected with the first section for providing motive power to a first cutting means;

a second mower section including support means for movably supporting the section above the ground and means operatively connected with the second section for providing motive power to a second cutting means;

a first hinge means extending above and substantially parallel to the ground immediately thereunder operatively connecting the first and second sections such that the second section is angularly displaceable relative to the first section about the first hinge means; and, a first angular position controlling means for limiting the angular position of the second section relative to the first section to a selected angular displacement range, the angular displacement range extending between a generally perpendicular angular position and a selected limit angular position, the first angular position controlling means including a first hydraulic cylinder operatively connected between the first and second sections, hydraulic fluid supply means for selectively supplying hydraulic fluid to the first hydraulic cylinder to control the relative extension of the first hydraulic cylinder, and first hydraulic pressure relief means for relieving hydraulic fluid pressure a preselected force such that the relative extension of the first hydraulic cylinder is altered, the first hydraulic cylinder and the hydraulic fluid supply means select the limit angular position, such that the first hydraulic cylinder is adapted for selectively fixing the second section cantilevered over the ground when the ground thereunder is lower than the ground under the first section by an angle outside of the angular displacement range, and the first hydraulic pressure relief means allows the extension of the first hydraulic cylinder to be altered to permit the first and second sections to be angularly displaced between the perpendicular and limit angular positions as the sections follow the contour of the ground thereunder, such that the first section remains substantially parallel to the ground thereunder, whereby the first hinge and a portion of the first section thereadjacent are not lifted further above the ground and out of the parallel relationship therewith by the second section when the ground under the second section is higher than the ground under the first section.

2. The wing mower as set forth in claim 1 wherein the first angular control means further includes a kinematic chain operatively connected between the first hydraulic cylinder and the first and second sections.

3. A trailing mower comprising:

a central mower section including supporting means for movably supporting the central section a preselected distance above and substantially parallel to the ground immediately thereunder and a first motor means operatively connected with the central section for providing motive power to a first cutting means;

a left wing section including supporting means for movably supporting the left wing section above the ground and means operatively connected with left wing section for providing motive power to a second cutting means;

a right wing section including supporting means for movably supporting the right wing section above the ground and means operatively connected with the right wing section for providing motive power to a third cutting means;

a first hinge means having a first axis extending generally a preselected distance above and parallel to the ground thereunder, the first hinge means being operatively connected with the central and left wing sections such that the left wing section is angularly displaceable upward and downward relative to the central section about the first hinge means axis;

a second hinge means having a second axis extending generally a preselected distance above and parallel to the ground thereunder, the second hinge means being operatively connected with the central and right wing sections such that the right wing section is angularly displaceable upward and downward relative to the central section about the second hinge means axis;

a first double acting hydraulic cylinder means operatively connected between the central and left wing sections for controlling the angular position of the left wing section relative to the central section;

a second double acting hydraulic cylinder means operatively connected between the central section and the right wing section for controlling the angular position of the right wing section relative to the central section; and, a wing attitude control means for independently limiting the angular displacement of the wing sections relative to the central section to a selected angular displacement range, the attitude control means including a hydraulic control circuit for selectively providing hydraulic fluid to the first and second cylinders for selecting the lowermost angular position of the angular displacement range of the left and right wing sections relative to the central section and holding the left and right wing sections cantilevered over ground thereunder which is lower than the ground under the central section by an angle outside the angular displacement range, the hydraulic circuit including pressure relief means operatively connected with the first and second cylinders for permitting each wing section to be angularly displaced upward toward a more vertical position when at least one of the wing section supporting means is urged upward by changes in contour of the ground, such that each wing section follows the contour of the ground over rises and remains cantilevered above depressions at the selected lowermost angular position.

4. The wing mower as set forth in claim 3 further including a first kinematic chain operatively connected with the central and left wing sections and the first hydraulic cylinder for converting changes in the extension of the first hydraulic cylinder into changes in the angular displacement of the left wing and a second kinematic chain operatively connected with the central and right wing sections and the second hydraulic cylinder for converting changes in the extension of the second hydraulic cylinder into changes in the angular displacement of the right wing.

5. The wing mower as set forth in claim 3 wherein the hydraulic circuit further includes a wing position control valve means for selectively adjusting the pressure of hydraulic fluid supplied to the first and second cylinders for selectively fixing the angular position of the left and right wing sections.

6. The wing mower as set forth in claim 5 wherein the first and second cylinders each include a wing section raising chamber and a wing section lowering chamber which are separated by a movable piston, the angular position control valve means selectively controlling the pressure differential across each piston to select the angular position of each wing section.

7. The wing mower as set forth in claim 6 wherein the pressure relief means includes at least one pressure relief valve operatively connected with wing lowering chambers for limiting the pressure in each wing lowering chamber such that arcuate movement of the wing section which tends to urge the piston to compress the hydraulic fluid in the wing lowering chamber causes the relief valve to remove fluid maintaining the wing lowering chamber at a selected pressure.

8. The wing mower as set forth in claim 7 further including at least one check valve operatively connected with the wing raising chamber to allow each wing raising chamber to draw fluid as the piston is displaced toward the wing lowering chamber maintaining the pressure differential across the piston.

9. The wing mower as set forth in claim 8 wherein the wing lowering chambers of the first and second cylinders are connected in parallel and the wing raising chambers of the first and second cylinders are connected in parallel, the pressure relief valve being connected between the wing lowering chambers of the first and second cylinders and a hydraulic fluid reservoir.

10. The wing mower as set forth in claim 8 wherein the wing angular position control means independently selects the fluid pressure differential across the piston of the first and second cylinders and wherein a first pressure relief valve is connected between the first cylinder wing lowering chamber and a fluid reservoir and a second pressure relief valve is connected between the second cylinder wing lowering chamber and the reservoir.

11. The wing mower, as set forth in claim 5 further including first, second, and third hydraulic motors mounted on the central, left wing, and right wing sections, respectively, for providing the motive power to the first, second, and third cutting means, respectively.

12. The wing mower as set forth in claim 11 wherein the hydraulic circuit further includes hydraulic motor control valving means for supplying hydraulic fluid to the central left wing and right wing section hydraulic motors.

13. The wing mower as set forth in claim 12 further including a heat exchanger operatively connected with at least one of the central section, the left wing and right wing sections for cooling hydraulic fluid received from the hydraulic motors.

14. A hydraulic trailing wing mower comprising:
(a) a central mower section having ground engaging wheels and a first hydraulic motor for providing motive power to a first rotary cutting blade, the central section being adapted to be pulled by a prime mover;
(b) a left wing section including at least one ground engaging wheel and a second hydraulic motor for providing motive power to a second rotary cutting blade;
(c) a right wing section including at least one ground engaging wheel and a third hydraulic motor for providing motive power to a third rotary cutting blade;
(d) hinge means operatively connecting the central section with the left and right wing sections such that the left and right wing sections are angularly displaceable relative to the central section;
(e) a first hydraulic cylinder operatively connected between the central section and the left wing section, the first hydraulic cylinder including a left wing raising chamber and a left wing lowering chamber which are separated by a slidable first piston;
(f) a second hydraulic cylinder operatively connected between the central section and the right wing section, the second hydraulic cylinder including a right wing raising chamber and a right wing lowering chamber which are separated by a slidable second piston; and,
(g) a hydraulic circuit comprising:
 (i) a hydraulic fluid reservoir;
 (ii) pump means for supplying hydraulic fluid from the reservoir under pressure;
 (iii) hydraulic motor control valve means operatively connected with the pump means for selectively directing hydraulic fluid under pressure to the first, second, and third hydraulic motors;
 (iv) heat exchanger means operatively connected between the first, second, and third hydraulic motors and the hydraulic reservoir for cooling hydraulic fluid returning to the reservoir from the motors, the heat exchanger means being operatively connected with at least one of the central, left wing, and right wing sections;
 (v) a wing angular position control valve means for selectively supplying hydraulic fluid under pressure from the pumping means to the left and right wing raising chambers and the left and right wing lowering chambers for limiting the angular position of the left and right wing sections relative to the central section, each to a lowermost angular position which is selected by the supplied hydraulic pressure, such that when the ground under one of the wing sections is sufficiently lower than the ground under the central section, the corresponding hydraulic cylinder holds the corresponding wing cantilevered over the ground thereunder;
 (vi) relief valve means operatively connected between the left and right wing lowering chambers and the hydraulic fluid reservoir for allowing hydraulic fluid to pass from the wing lowering chambers to the reservoir in response to the central section being urged downward relative to at least one of the wing sections, such that the left and right wings move upward from the lowermost angular position to follow rises in the ground; and,
 (vii) check valve means operatively connected between the hydraulic fluid reservoir and the left and right wing raising chambers for allowing hydraulic fluid to be drawn from the reservoir into the left and right wing raising chambers in response to at least one of the wings being moved upward relative to the central sectiion, such that above the lowermost angular position each wing is permitted to be angularly displaced relative to the central section to follow contours of the ground.

15. The hydraulic wing mower as set forth in claim 14 wherein the heat exchanger includes an array of tubular frame members for providing structural support to the central section, which tubular frame members provide a closed hydraulic fluid path for hydraulic fluid moving between the hydraulic motors and the reservoir and provide surface contact with the ambient air for allowing heat to be radiated from the tubular frame members into the ambient air.

16. The hydraulic wing mower as set forth in claim 14 wherein the relief valve means includes a first relieve valve operatively connected between the left wing lowering chamber and the reservoir and a second relief valve operatively connected between the right wing lowering chamber and the reservoir.

17. A trailing wing mower comprising:
 a central mower section including supporting means for movably supporting the first section above the ground and a first motor means operatively connected with the first section for providing motive power to a first cutting means;
 a left wing section including supporting means for movably supporting the left wing section above the ground and means operatively connected with the left wing section for providing motive power to a second cutting means;
 a right wing section including supporting means for movably supporting the right wing section above the ground and means operatively connected with the right wing section for providing motive power to a third cutting means;
 a first hinge means operatively connected with the central and left wing sections such that the left wing section is angularly displaceable relative to the central section about the first hinge means;
 a second hinge means operatively connecting the central and right wing sections such that the right wing section is angularly displaceable relative to the central section about the second hinge means;
 a first hydraulic cylinder means pivotally connected with the central section;
 a second hydraulic cylinder means pivotally connected with the central section;
 a first kinematic chain operatively connected with the first hydraulic cylinder and the central and left wing sections for converting changes in the extension of the first hydraulic cylinder into corresponding changes in the angular position of the left wing section, the first kinematic chain including:
  a first drive link pivotally connected at one end with the central section and pivotally connected closely adjacent its other end with the first hydraulic cylinder,
  a first floating link pivotally connected at one end closely adjacent the first drive link other end and pivotally connected at its other end with the left wing section such that the floating link connects the first hydraulic cylinder with the left wing to exert lifting forces thereon,
  the first hydraulic cylinder and the first floating link being connected with the first drive link such that the first drive link spaces the first hydraulic cylinder from the central section without providing a mechanical advantage between the first hydraulic cylinder and the first floating link;
 a second kinematic chain operatively connected with the second hydraulic cylinder and the central and right wing sections for converting changes in the extension of the first hydraulic cylinder into corresponding changes in the angular position of the right wing section, the second kinematic chain including:
  a second drive link pivotally connected at one end with the central section and pivotally connected closely adjacent its other end with the second hydraulic cylinder,
  a second floating link pivotally connected at one end closely adjacent the second drive link other end and pivotally connected at its other end with the right wing section such that the floating link connects the second hydraulic cylinder with the right wing to exert lifting forces thereon,
  the second hydraulic cylinder and the second floating link being connected with the second drive link such that the second drive link spaces the second hydraulic cylinder from the central section without providing a mechanical advantage between the second hydraulic cylinder and the second floating link; and,
 a wing attitude control means for independently limiting the relative angular displacement of the wing sections relative to the central section to a selected angular displacement range, the angular displacement range extending between a generally perpendicular relative angular displacement and a lowermost angular displacement, the attitude control means including a hydraulic circuit for selectively controlling the extension of the first and second hydraulic cylinders to select the lowermost angular displacement at which each wing section is held cantilevered over ground which is sufficiently lower than the ground under the central section that the wing section is unsupported thereby, the hydraulic circuit including pressure relief means for releasing hydraulic fluid from the first and second hydraulic cylinders in response to a force which urges the left and right wings, respectively, upward relative to the central section toward a more vertical orientation such that the wing sections are movable through the angular displacement range.

18. A trailing wing mower comprising:
(a) a central mower section having ground engaging wheels and a motor for providing motive power to a first rotary cutting blade, the central section being adapted to be pulled by a prime mover;
(b) a left wing section including at least one ground engaging wheel and means for providing motive power to a second rotary cutting blade;
(c) a right wing section including at least one ground engaging wheel and means for providing motive power to a third rotary cutting blade;
(d) hinge means operatively connecting the central section with the left and right wing sections such that the left and right wing sections are angularly displaceable relative to the central section;
(e) a first through-rod-type hydraulic cylinder operatively connected between the central section and the left wing section, the first through-rod-type hydraulic cylinder including a left wing raising chamber and a left wing lowering chamber which are separated by a slidable first piston mounted on a first rod which extends through both the left wing raising and lowering chambers;
(f) a second through-rod-type hydraulic cylinder operatively connected between the central section and the right wing section, the second through-rod-type hydraulic cylinder including a right wing raising chamber and a right wing lowering chamber which are separated by a slidable second piston mounted on a second rod which extends through both the right wing raising and lowering chambers; and,
(g) a hydraulic circuit comprising:
  (i) a hydraulic fluid reservoir;
  (ii) pump means for supplying hydraulic fluid from the reservoir under pressure;
  (iii) a wing angular position control valve means for selectively supplying hydraulic fluid under pressure from the pumping means to the left and right wing raising chambers and the left and right wing lowering chambers for selecting a pressure differential across the first and second pistons to bias the left and right wing sections to a selected lowermost angular positions at which each wing section is held cantilevered over ground thereunder which is too low to support the corresponding wing second ground engaging wheel when the corresponding wing section is in the lowermost angular position;
  (iv) first relief valve means connected between the left wing lowering and raising chambers for allowing hydraulic fluid to pass from the left wing lowering chamber to the left wing raising chamber in response to the pressure in the left wing lowering chamber exceeding a preselected left wing upward breakaway pressure, whereby the left wing is angularly displaced above the lowermost angular position to follow contours in the ground thereunder and limited in downward movement to the lowermost angular position; and,
  (v) a second relief valve means connected between the right wing raising and lowering chambers for allowing hydraulic fluid to pass from the right wing lowering chamber to the right wing raising chamber in response to the pressure in the right wing lowering chamber exceeding a preselected right wing upward breakaway pressure, whereby the right wing is angularly displaced above the lowermost angular position to follow contours in the ground thereunder and is limited in downward movement to the lowermost angular position.

* * * * *